United States Patent [19]

Evan

[11] 3,798,518

[45] Mar. 19, 1974

[54] VARIABLE DURATION BRAKING CIRCUIT FOR A MOMENTARY INTERMITTENTLY DRIVEN WEB TRANSPORTING MECHANISM

[75] Inventor: George E. Evan, Rochester, N.Y.

[73] Assignee: Eastman Kodak Company, Rochester, N.Y.

[22] Filed: Oct. 13, 1972

[21] Appl. No.: 297,519

[52] U.S. Cl. .................................. 318/6, 318/363
[51] Int. Cl. ............................................ H02p 3/04
[58] Field of Search ........... 318/6, 7, 362, 363, 372, 318/443, 444

[56] References Cited
UNITED STATES PATENTS
3,003,087 10/1961 Kraay ............................. 318/444 X
3,508,133 4/1970 Schneider et al. ............. 318/362 X Primary Examiner—Harold Broome
Attorney, Agent, or Firm—William T. French

[57] ABSTRACT

A momentary intermittently driven web transporting mechanism having incorporated therein a variable duration braking circuit for a web supply reel. In those instances where a web drive mechanism is momentarily intermittently operated for successively driving the web short distances, a shorter momentary braking time is required to prevent rotation of the supply reel than in those situations where the web drive mechanism is operated for a time period sufficient to drive a web take-up reel and web at substantially maximum torque or speed. the variable duration braking circuit of this invention provides a momentary braking time period for the supply reel following momentary inactivation of the brake of a duration that is a function of the time period that the braking circuit is inactivated and/or the drive mechanism operated to transport the web.

8 Claims, 2 Drawing Figures

VARIABLE DURATION BRAKING CIRCUIT FOR A MOMENTARY INTERMITTENTLY DRIVEN WEB TRANSPORTING MECHANISM

BACKGROUND OF THE INVENTION

1. Field of the Invention

This invention relates generally to web handling systems, and more specifically to a web transporting mechanism having a variable duration braking circuit.

2. Description of the Prior Art

Web transporting mechanisms having a web supply reel and a take-up reel onto which the web is wound from the supply reel are known in the art. It is also known to provide a drive mechanism for the take-up reel comprising a clutch, a braking mechanism for the supply reel, and control means interconnecting the clutch and brake so that when the clutch is activated to drive the take-up reel, the brake is inactivated, and when the clutch is inactivated for disengaging the drive to the take-up reel, the brake is activated to brake the supply reel. In such known web transporting mechanisms, the supply reel is braked for a constant duration sufficient to overcome the maximum driving torque applied to the take-up reel. Although the constant braking duration is sufficient to overcome the maximum torque of the take-up drive motor and hence is satisfactory for most applications, it results in an increased operating time for those applications in which the take-up reel is momentarily intermittently driven for time periods on the order of 20 to 50 milliseconds duration. In such applications, maximum torque is not applied to the reel and hence a shorter braking time is required to stop the supply reel. One of such applications involves a film inspection and breakdown work place in which a large number of customers' films, previously spliced together and wound onto a supply reel to form a continuous web, are transported through an inspection workplace where the films are inspected, separated and wound onto individual customer take-up reels. In such an inspection and breakdown workplace, the trailing end of a customer's film is secured to the take-up reel, the take-up reel driven to wind the film onto the reel, and the take-up reel stopped when the end of the customer's film is reached. At this point, the operator preferably manually breaks the splice between the customer's film wound on the take-up reel and the succeeding customer's film. The filled customer's reel is removed, an empty reel mounted on the take-up spindle, and the winding operation performed for the next customer's film. Accordingly, for each customer's film, it is necessary for the operator to start and stop the take-up reel at the beginning and end of each customer's film. In addition, to permit operator inspection of the film, it is normal to momentarily stop and start the take-up reel for time periods under 50 milliseconds, referred to as jogging, approximately three times in succession between the beginning and end of each film. During such jogging, the film is advanced a few inches at a time. Assuming, for example, that a brake signal of 150 milliseconds duration is sufficient to overcome maximum driving torque, a brake signal of such duration applied to the supply reel adds a time delay to the operation, in those instances where jogging is done, and a brake signal of possibly only 20 to 50 milliseconds is sufficient to brake the supply reel. The added time delay increases the inspection time and operator fatigue associated therewith. Applicant's invention is believed to eliminate this added time delay, and to provide smooth and rapid jogging by providing a variable duration braking signal to the supply reel following momentary brake inactivation that is a function of the time period that the braking circuit is inactivated and/or the clutch energized for driving the take-up reel.

SUMMARY OF THE INVENTION

In accordance with a preferred embodiment of the invention, a variable duration braking means for the supply reel of a web transporting mechanism is disclosed. The web transporting mechanism can be of any suitable type in which a take-up reel is driven by any suitable driving means for winding thereon a web from a supply reel. The supply reel is provided with a braking means to prevent unwinding of the web therefrom when the take-up reel is not driven. The web transporting mechanism is further provided with control means for the driving and braking means for substantially simultaneously inactivating the driving means and activating the braking means for a time period which is a function of the time period the braking circuit is inactivated and/or the clutch activated for transporting the web.

It is, accordingly, one of the objects of the present invention to provide an improved web transporting mechanism having a braking mechanism for the web supply reel in which the braking duration is variable.

Another object of the invention is to provide an improved control circuit for the web transporting and braking mechanisms of a web transporting mechanism in which the braking duration following momentary inactivation of the braking circuit is variable and dependent upon the duration of time the braking circuit is inactivated and/or the driving means activated for transporting the web.

Another object of the invention is to provide an improved web transporting mechanism in which web transport is intermittently, momentarily started and stopped with a minimum of time delay.

Another object of the invention is to provide an improved control circuit for the web transporting and braking mechanism of a web transporting mechanism that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because web transporting mechanisms are well known, the present description will be directed in particular to the control circuit forming part of, or cooperating more directly with apparatus in accordance with the present invention. Elements of the web transporting mechanism not specifically shown or described herein should be understood to be selectable from those known in the art.

Figure 1:
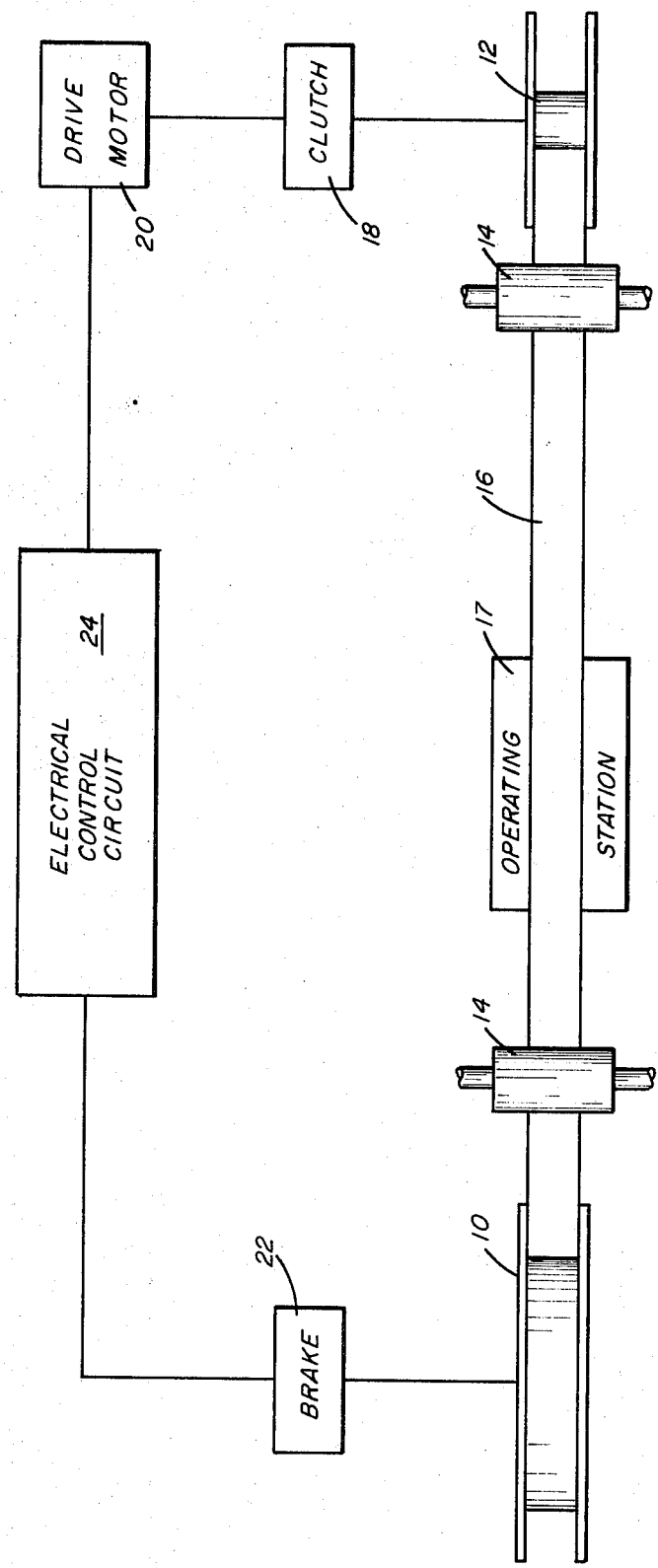
FIG. 1 is a top plan view partially in block diagram form illustrating a web transporting mechanism in which a preferred embodiment of the braking control circuit is incorporated.
Figure 2:
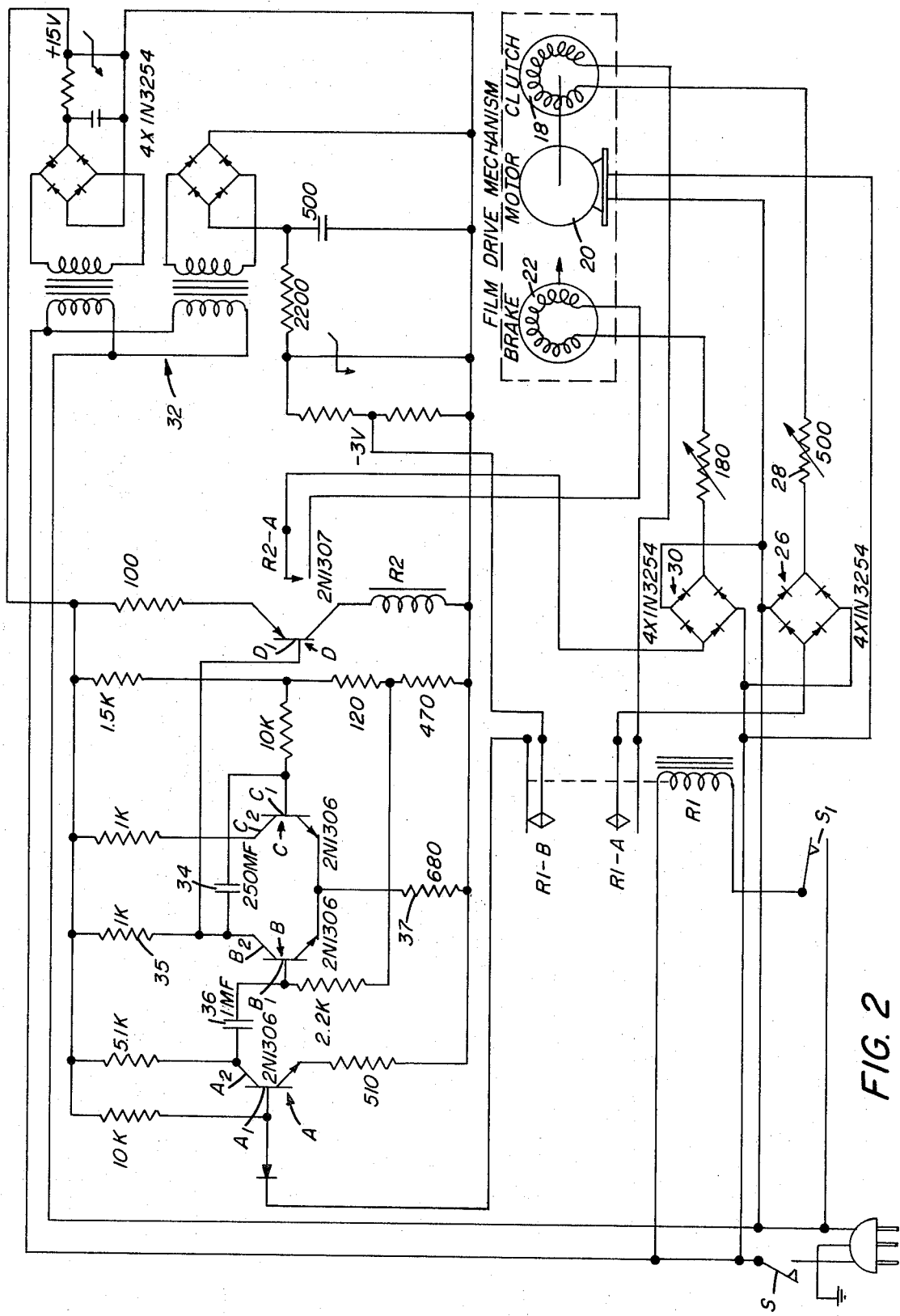
FIG. 2 is an electrical circuit diagram illustrating the control circuit of FIG. 1.

With reference to FIG. 1 of the drawing, a web transporting mechanism of any suitable type is illustrated having a web supply reel 10, a web take-up reel 12, and guide rollers 14 for guiding a web 16 from supply reel 10 over an operating station 17 such as an inspection table and onto take-up reel 12. The take-up reel is intermittently driven through a preferably solenoid-operated clutch 18 coupled to a constantly driven drive motor 20. To prevent overrunning of supply reel 10 and unwinding of web 16 when take-up reel 12 is stopped, the supply reel is provided with any suitable brake such as a solenoid-operated brake 22. An electrical control circuit 24 as best illustrated in FIG. 2 is provided for the web transporting mechanism to permit momentary, intermittent operation of take-up reel 12 following an initial braking operation with a minimum of operating time, thereby reducing operator fatigue. The electrical control circuit 24 achieves this objective by providing a variable braking time duration for the supply reel following momentary activation of the braking circuit which is a function of the time that the braking circuit is inactivated and/or clutch 18 activated for driving take-up reel 12 and transporting the web.

The preferred embodiment of the electrical control circuit 24 of this invention has a start switch S which when closed or placed in an "on" position connects a power source to motor 20 of a driving circuit for continuously driving the motor and energizing all power supplies. The clutch 18 has one terminal connected to the power source through a diode-bridge rectifier 26, and the other terminal connected to normally open relay contacts R1-A. Relay contacts R1-A are operated by a relay R1 connected to the power source through a normally open, single control foot switch $S_1$. Accordingly, when foot switch $S_1$ is depressed closing the switch, relay R1 is energized closing normally open relay contact R1-A. This completes the power circuit to clutch 18 for energizing or activating the clutch and drivingly coupling motor 20 to take-up reel 12. The degree of softness or hardness with which clutch 18 is energized is adjusted by a variable resistor 28.

The brake solenoid 22 of the braking circuit for supply reel 10 has one contact connected through any suitable diode-bridge rectifier 30 to the power source, and the other contact thereof connected to normally open relay contacts R2-A. The relay contacts R2-A are controlled by a relay R2 in the circuit of a transistorized relay driver D. Relay driver D is coupled to a monostable, multi-vibrator circuit comprising transistors B and C which are in turn coupled to a transistorized, signal-conditioning amplifier A. The AC power source is fed into a DC power supply circuit 32 for producing a constant negative voltage DC input signal which is fed through normally closed relay contacts R1-B to the input or base $A_1$ of amplifier A.

The theory of operation of the electrical control circuit 24 of this invention is believed to be as follows. When switch S is closed with foot switch $S_1$ is in its normally open position as seen in FIG. 2, relay contacts R1-B of the braking circuit remain in their normally closed position and amplifier A begins to conduct due to a constant negative input signal being fed thereto. When amplifier A is initially turned on, multivibrator transistors B and C are activated as explained hereinafter to turn on driver D energizing relay R2 and brake 22 for a predetermined time duration. However, since the film drive mechanism is inactive, such energization of brake 22 accomplishes no purpose. The multivibrator transistors B and C return to and remain in their normal stable condition (B off and C on), since the coupling condenser 36 has discharged through amplifier A and, in any event, passes AC or a changing DC signal only. Accordingly, following initial activation of the braking circuit, as indicated above, the braking circuit is inactive with relay R2 de-energized, and relay contacts R2-A in their normally open position.

When foot switch $S_1$ is depressed or closed, relay R1 is energized opening normally closed relay contacts R1-B which disconnect the DC negative input signal to amplifier A. Accordingly, the braking circuit remains in its inactive state. Substantially simultaneously, relay contacts R1-A of the driving circuit are moved to their closed position activating the driving means by energizing clutch 18 which drivingly couples motor 20 to take-up reel 12. Accordingly, reel 12 is driven and web 16 wound from supply reel 10 to reel 12. Let us assume that foot switch $S_1$ has been depressed or closed for an appreciable duration such as two seconds, for example, sufficient to obtain maximum driving torque, and then opened to stop further web advance. Prior to such opening of switch $S_1$, the braking circuit is in its inactive position in which amplifier A is off, transistor B is off, transistor C is conducting, driver transistor D is off and coupling condensers 34, 36 are fully charged. Opening of switch $S_1$ activates the braking circuit by de-energizing relay R1 causing contacts R1-B of the braking circuit to close sending a negative DC signal from the power supply to the base of amplifier A. Amplifier A is energized feeding a signal from collector $A_2$ of amplifier A to base $B_1$ of transistor B, through fully charged coupling condenser 36. Transistor B begins to conduct causing the high positive voltage on collector $B_2$ of transistor B to become less positive. This negative going signal voltage is coupled to the base $C_1$ of transistor C through fully charged condenser 34 and its forward bias is decreased. Accordingly, the base $C_1$ and collector $C_2$ currents of transistor C decrease. The collector $C_2$ voltage of transistor C increases positively and the voltage on the common emitter resistor 37 becomes negative, changing rapidly the base-emitter junction voltage which results in transistor B continuing to be turned on and transistor C to be turned off. The reduced positive voltage on collector $B_2$ of transistor B is fed to the base $D_1$ of relay driver transistor D, turning it on and causing relay $R_2$ to be energized closing contacts R2-A for applying a power signal to brake solenoid 22. Coupling condenser 34, which has a long time constant, discharges through the low resistance of the turned on transistor B. This causes the base $C_1$ potential of transistor C to become less negative, and when it become slightly positive, transistor C again returns to its normal conducting position. When transistor C conducts, the voltage across common emitter resistor 37 becomes more positive resulting in reverse biasing of transistor B which is returned to its normal "off" condition. When transistor B is turned off, relay driver D is also turned off at the same time. With the circuit components illustrated in FIG. 2, particularly the large capacity condenser 34, the brake signal is applied to brake 22 through relay driver D for a time interval of substantially 150 milliseconds which in this illustration is sufficient to overcome maximum torque generated by the film drive mechanisms. The brake is then automatically inactivated when the monostable multivibrator returns to is normal stable condition to permit film to be withdrawn for inspection or the like from either the take-up or supply reels.

During a jogging operation to achieve web inspection, foort switch $S_1$ is momentarily intermittently closed and opened by the operator following momentary activation of the braking circuit at a fast rate on the order of 20 to 50 milliseconds, for example, and the generated braking signal is of a short duration less than 150 milliseconds. During such operation, momentary closing of switch $S_1$ for 20 to 50 milliseconds duration turns off amplifer A, rapidly charges the small capacity coupling condenser 36 almost to the positive supply voltage level, and begins to charge capacitor 34 which normally requires 200 to 250 milliseconds to charge up fully. When switch $S_1$ is substantially immediately opened, having been closed only 20 to 50 milliseconds, the negative DC signal from the power supply is applied to amplifier A, turning it on. This action causes transistor B to be turned on through charged condenser 36 and transistor C to be turned off. However, since the large capacity coupling condenser 34 is only partially charged during the 20 to 50 milliseconds time duration that switch $S_1$ is closed, transistor B conducts for a time period shorter than 150 milliseconds resulting in the application of a braking signal of shorter duration on the order of 20 to 50 milliseconds. The multivibrator returns to its normal condition with transistor B off and transistor C on. The described action holds true for any time duration shorter than 200 to 250 milliseconds that switch $S_1$ is closed or the braking circuit inactive. For time durations greater than 200 to 250 milliseconds, opening of switch $S_1$ causes the monostable multivibrator to go into its unstable condition, turning on the relay driver D for substantially 150 milliseconds, and then turning it off as the braking circuit returns to its inactive condition.

The invention has been described in detail with particular reference to the preferred embodiment thereof, but it will be understood that variations and modifications can be effected within the spirit and scope of the invention as described hereinabove.

What is claimed is:

1. In a web winding mechanism having a web supply reel and a web take-up reel, the combination comprising:

means adapted when activated to drive said take-up reel for winding a web from said supply reel onto said take-up reel;

means adapted when activated to brake said supply reel to stop winding of the web onto said take-up reel; and electrical circuit control means for said drive and brake means for sequentially substantially simultaneously activating said drive means and inactivating said brake means, and inactivating said drive means and activating said brake means, said control means including a driving circuit adapted when activated and inactivated to activate and inactivate said drive means respectively and a braking circuit adapted when activated and inactivated to activate and inactivate said brake means respectively, said braking circuit adapted when activated following momentary activation of said driving circuit and inactivation of said braking circuit to momentarily activate said brake means for a time duration which is a function of the time duration said braking circuit was inactivated and/or said driving circuit was activated.

2. The invention according to claim 1 wherein said driving means comprises a drive motor and an electrically operated clutch adapted when activated to drivingly connect said drive motor to said take-up reel, said braking means comprises an electrically operated brake coupled to said supply reel and adapted when activated to brake said supply reel, and said electrical circuit control means comprises a manually operated switch movable between a closed position, in which said clutch is activated and said brake inactivated to advance and wind the web onto the take-up reel, and a normal open position, in which said clutch is inactivated and said brake momentarily activated to stop web advance.

3. The invention according to claim 2 wherein said manually operated switch is a foot switch.

4. The invention according to claim 2 wherein said braking circuit comprises a current producing circuit connected to said brake, said electrical circuit control means comprising a first normally open relay contact connected to said clutch, a second normally closed relay contact connected to said braking circuit, and a first relay for controlling said first and second relay contacts and in turn controlled by said manually operated switch.

5. The invention according to claim 4 wherein said current producing circuit comprises a second relay, and a third normally open relay contact connected to said brake and controlled by said second relay.

6. The invention according to claim 4 wherein said current producing circuit comprises a second relay, and a third normally open relay contact connected to said brake and controlled by said second relay, said electrical circuit control means further comprises a driver for said second relay, a monostable multivibrator connected to said driver and including a capacitor adapted to be fully charged only when said manually operated switch is closed for a predetermined time duration, and only partially charged when said switch is closed for a time duration less than said predetermined time whereby said third normally open relay contact is closed for a varying time depending upon the charged condition of said capacitor.

7. The invention according to claim 6 wherein said predetermined time duration is substantially 200 to 250 milliseconds.

8. In a web transporting mechanism for transporting a web from a rotatable web supply reel, the combination comprising:

brake means adapted when activated to prevent rotation of said supply reel to prevent unwinding of the web therefrom, and when inactive to permit rotation of said supply reel and unwinding of the web therefrom; and electrical control circuit means for said brake means operative following inactivation of said brake means to momentarily activate said brake means for a time duration which is a function of the time duration said brake means was inactivated, said electrical control circuit means comprising a power source, a normally closed first relay contact for introducing into said control circuit means a signal from said power source, a first relay for controlling said first relay contact, and a current producing circuit responsive to said signal for activating said control circuit means, said current producing circuit comprising a monostable multi vibrator electrically connected to said first relay contact, a driver electrically connected to the outlet of said multivibrator, a second relay driven by said driver, and a second normally open relay contact controlled by said second relay and connected to said brake.

* * * * *